US012315519B2

(12) United States Patent
Näslund et al.

(10) Patent No.: US 12,315,519 B2
(45) Date of Patent: *May 27, 2025

(54) FRAME ERROR CONCEALMENT

(71) Applicant: Telefonaktiebolaget LM Ericsson (publ), Stockholm (SE)

(72) Inventors: Sebastian Näslund, Solna (SE); Volodya Grancharov, Solna (SE); Jonas Svedberg, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/386,020

(22) Filed: Nov. 1, 2023

(65) Prior Publication Data

US 2024/0144939 A1 May 2, 2024

Related U.S. Application Data

(63) Continuation of application No. 17/570,460, filed on Jan. 7, 2022, now Pat. No. 11,837,240, which is a (Continued)

(51) Int. Cl.
*G10L 19/005* (2013.01)
*G10L 19/025* (2013.01)

(52) U.S. Cl.
CPC .......... *G10L 19/005* (2013.01); *G10L 19/025* (2013.01)

(58) Field of Classification Search
None
See application file for complete search history.

(56) References Cited

U.S. PATENT DOCUMENTS

| | | | | |
|---|---|---|---|---|
| 5,699,485 A * | 12/1997 | Shoham | G10L 19/005 | 341/94 |
| 9,514,756 B2 * | 12/2016 | Nälund et al. | G10L 19/005 | |

(Continued)

FOREIGN PATENT DOCUMENTS

| | | |
|---|---|---|
| CA | 2425034 | 5/2002 |
| CN | 101572685 | 11/2009 |

(Continued)

OTHER PUBLICATIONS

Akinori Ito et al. "Robust Transmission of Audio Signals over the Internet: An Advanced Packet Loss Concealment for MP3-Based Audio Signals" Interdisciplinary Information Sciences, vol. 18. No. 2. (2012) pp. 99-105.

(Continued)

*Primary Examiner* — Douglas Godbold
(74) *Attorney, Agent, or Firm* — Rothwell, Figg, Ernst & Manbeck, P.C.

(57) ABSTRACT

A frame error concealment method based on frames including transform coefficient vectors including the following steps: It tracks sign changes between corresponding transform coefficients of predetermined sub-vectors of consecutive good stationary frames. It accumulates the number of sign changes in corresponding sub-vectors of a predetermined number of consecutive good stationary frames. It reconstructs an erroneous frame with the latest good stationary frame, but with reversed signs of transform coefficients in sub-vectors having an accumulated number of sign changes that exceeds a predetermined threshold.

18 Claims, 7 Drawing Sheets

Related U.S. Application Data continuation of application No. 16/747,269, filed on Jan. 20, 2020, now Pat. No. 11,227,613, which is a continuation of application No. 15/989,618, filed on May 25, 2018, now Pat. No. 10,566,000, which is a continuation of application No. 15/271,930, filed on Sep. 21, 2016, now Pat. No. 10,013,989, which is a continuation of application No. 14/767,499, filed as application No. PCT/SE2013/051332 on Nov. 12, 2013, now Pat. No. 9,514,756.

(60) Provisional application No. 61/764,254, filed on Feb. 13, 2013.

(56) References Cited

U.S. PATENT DOCUMENTS

| | | | | |
|---|---|---|---|---|
| 10,013,989 | B2 * | 7/2018 | Nälund et al. | G10L 19/025 |
| 10,566,000 | B2 * | 2/2020 | Nälund et al. | G10L 19/005 |
| 11,227,613 | B2 * | 1/2022 | Nälund et al. | G10L 19/025 |
| 11,837,240 | B2 * | 12/2023 | Nälund et al. | G10L 19/025 |
| 2005/0154584 | A1 * | 7/2005 | Jelinek | G10L 19/00 704/219 |
| 2006/0176802 | A1 | 8/2006 | Ko et al. | |
| 2009/0103517 | A1 | 4/2009 | Ohmuro et al. | |
| 2009/0192803 | A1 * | 7/2009 | Nagaraja | G10L 19/012 704/278 |
| 2010/0049506 | A1 | 2/2010 | Zhan et al. | |
| 2010/0094642 | A1 | 4/2010 | Zhan et al. | |
| 2011/0125505 | A1 * | 5/2011 | Vaillancourt | G10L 19/005 704/500 |
| 2011/0191111 | A1 | 8/2011 | Chu et al. | |
| 2013/0144632 | A1 * | 6/2013 | Sung | G10L 19/0017 704/503 |
| 2015/0379998 | A1 * | 12/2015 | Nälund et al. | G10L 19/005 704/203 |

FOREIGN PATENT DOCUMENTS

| | | |
|---|---|---|
| CN | 101662442 | 3/2010 |
| CN | 101917257 | 12/2010 |
| EP | 1288916 | 3/2003 |
| RU | 2419891 | 5/2011 |
| RU | 2 459 282 | 8/2012 |
| WO | 2007051124 | 5/2007 |
| WO | 2008066264 | 6/2008 |
| WO | 2009010831 | 1/2009 |

OTHER PUBLICATIONS

Zhu Meng Yao et al. "Efficient Algorithm for Packet Loss Concealment Based on Sinusoid and Transient in MDCT Domain" 2009 Pacific-Asia Conference on Circuits, Communications and Systems, IEEE Computer Society, 2009, pp. 330-333.

International Preliminary Report on Patentability issued in corresponding International application No. PCT/SE2013/051332, dated Apr. 22, 2015, 13 pages.

International Search Report and issued in corresponding International application No. PCT/SE2013/051332, dated May 22, 2014, 3 pages.

Ryu, S., et al., "Encoder Assisted Frame Loss Concealment For MPEG- AAC Decoder", Acoustics, Speech and Signal Processing, 2006, ICASSP 2006 Proceedings, 2006 IEEE International Conference On Toulouse, France May 14-19, 2006, Piscataway, NJ, USA, IEEE, , USA Piscataway, NJ,May 14, 2006, 4 pages, XP031387103.

Extended European Search Report dated Oct. 19, 2016 in corresponding European Application No. EP16179227.0, 11 pages.

Search Report dated Dec. 6, 2016 issued in corresponding Russian Application No. 2015138979/08(059777), 2 pages (English translation only).

The extended European Search Report issued in Application No. 18191125.6 dated Nov. 20, 2018, 10 pages.

Russian Office Action and Search Report dated May 28, 2019 issued in Russian Patent Application No. 2017126008. (5 pages).

Brazilian Office Action dated Sep. 3, 2019 issued in Brazilian Patent Application No. BR112015017082-0. (5 pages).

* cited by examiner

FRAME ERROR CONCEALMENT

CROSS-REFERENCE TO RELATED APPLICATIONS

This Application is:

- a continuation of U.S. application Ser. No. 17/570,460, filed on 2022 Jan. 7 (now U.S. Pat. No. 11,837,240, which issued on 2023 Dec. 5), which is
- a continuation of U.S. application Ser. No. 16/747,269, filed on 2020 Jan. 20 (now U.S. Pat. No. 11,227,613, which issued on 2022 Jan. 18), which is
- a continuation of U.S. application Ser. No. 15/989,618, filed on 2018 May 25 (now U.S. Pat. No. 10,566,000, which issued on 2020 Feb. 18), which is
- a continuation of U.S. application Ser. No. 15/271,930, filed on 2016 Sep. 21 (now U.S. Pat. No. 10,013,989, which issued on 2018 Jul. 3), which is
- a continuation of U.S. application Ser. No. 14/767,499, which has a 371(c) date of 2015 Aug. 12 (now U.S. Pat. No. 9,514,756, which issued on 2016 Dec. 6), which is
- the 35 U.S.C. § 371 National Stage of international patent application no. PCT/SE2013/051332, filed 2013 Nov. 12, which
- claims priority to U.S. application No. 61/764,254, filed on 2013 Feb. 13.

The above identified applications and patents are incorporated by this reference.

TECHNICAL FIELD

The proposed technology relates to frame error concealment based on frames including transform coefficient vectors.

BACKGROUND

High quality audio transmission may typically utilize transform-based coding schemes. The input audio signal is usually processed in time-blocks called frames of certain size e.g. 20 ms. A frame is transformed by a suitable transform, such as e.g. the Modified Discrete Cosine Transform (MDCT), and the transform coefficients are then quantized and transmitted over the network.

However, when an audio codec is operated in a communication system which includes wireless or packet networks, a frame could get lost in the transmission, or arrive too late, in order to be used in a real-time scenario. A similar problem arises when the data within a frame has been corrupted, and the codec may be set to discard such corrupted frames. The above examples are called frame erasure or packet loss, and when it occurs the decoder typically invokes certain algorithms to avoid or reduce the degradation in audio quality caused by the frame erasure, and such algorithms are called frame erasure (or error) concealment-algorithms (FEC) or packet loss concealment-algorithms (PLC).

FIG. 1 illustrates an audio signal input in an encoder 10. A transform to a frequency domain is performed in step S1, a quantization is performed in step S2, and a packetization and transmission of the quantized frequency coefficients (represented by indices) is performed in step S3. The packets are received by a decoder 12 in step S4, after transmission, and the frequency coefficients are reconstructed in step S5, wherein a frame erasure (or error) concealment algorithm is performed, as indicated by an FEC unit 14. The reconstructed frequency coefficients are inverse transformed to the time domain in step S6. Thus, FIG. 1 is a system overview, in which transmission errors are handled at the audio decoder 12 in the process of parameter/waveform reconstruction, and a frame erasure concealment-algorithm performs a reconstruction of lost or corrupt frames.

The purpose of error concealment is to synthesize lost parts of the audio signal that do not arrive or do not arrive on time at the decoder, or are corrupt. When additional delay can be tolerated and/or additional bits are available one could use various powerful FEC concepts that can be based e.g. on interpolating lost frame between two good frames or transmitting essential side information.

However, in a real-time conversational scenario it is typically not possible to introduce additional delay, and rarely possible to increase bit-budget and computational complexity of the algorithm. Three exemplary FEC approaches for a real-time scenario are the following: (1) Muting, wherein missing spectral coefficients are set to zero; (2) Repetition, wherein coefficients from the last good frame are repeated; and (3) Noise injection, wherein missing spectral coefficients are the output of a random noise generator.

An example of an FEC algorithm that is commonly used by transform-based codecs is a frame repeat-algorithm that uses the repetition-approach, and repeats the transform coefficients of the previously received frame, sometimes with a scaling factor, for example as described in [1]. The repeated transform coefficients are then used to reconstruct the audio signal for the lost frame. Frame repeat-algorithms and algorithms for inserting noise or silence are attractive algorithms, because they have low computational complexity and do not require any extra bits to be transmitted or any extra delay. However, the error concealment may degrade the reconstructed signal. For example, a muting-based FEC-scheme could create large energy discontinuities and a poor perceived quality, and the use of a noise injection algorithm could lead to negative perceptual impact, especially when applied to a region with prominent tonal components.

Another approach described in [2] involves transmission of side information for reconstruction of erroneous frames by interpolation. A drawback of this method is that it requires extra bandwidth for the side information. For MDCT coefficients without side information available, amplitudes are estimated by interpolation, whereas signs are estimated by using a probabilistic model that requires a large number of past frames (50 are suggested), which may not be available in reality.

A rather complex interpolation method with multiplicative corrections for reconstruction of lost frames is described in [3].

A further drawback of interpolation based frame error concealment methods is that they introduce extra delays (the frame after the erroneous frame has to be received before any interpolation may be attempted) that may not be acceptable in, for example, real-time applications such as conversational applications.

SUMMARY

An object of the proposed technology is improved frame error concealment.

This object is met by embodiments of the proposed technology.

According to a first aspect, there is provided a frame error concealment method based on frames including transform coefficient vectors. The method involves tracking sign changes between corresponding transform coefficients of predetermined sub-vectors of consecutive good stationary frames. The method also involves accumulating the number of sign changes in corresponding sub-vectors of a predetermined number of consecutive good stationary frames. Furthermore, the method involves reconstructing an erroneous frame with the latest good stationary frame, but with reversed signs of transform coefficients in sub-vectors having an accumulated number of sign changes that exceeds a predetermined threshold.

According to a second aspect, there is provided a computer program for frame error concealment based on frames including transform coefficient vectors. The computer program comprises computer readable code which when run on a processor causes the processor to perform the following actions: It tracks sign changes between corresponding transform coefficients of predetermined sub-vectors of consecutive good stationary frames. It accumulates the number of sign changes in corresponding sub-vectors of a predetermined number of consecutive good stationary frames. It reconstructs an erroneous frame with the latest good stationary frame, but with reversed signs of transform coefficients in sub-vectors having an accumulated number of sign changes that exceeds a predetermined threshold.

According to a third aspect, there is provided a computer program product, comprising a computer readable medium and a computer program according to the second aspect stored on the computer readable medium.

According to a fourth aspect, the proposed technology involves an embodiment of a decoder configured for frame error concealment based on frames including transform coefficient vectors. The decoder includes a sign change tracker configured to track sign changes between corresponding transform coefficients of predetermined sub-vectors of consecutive good stationary frames. The decoder further includes a sign change accumulator configured to accumulate the number of sign changes in corresponding sub-vectors of a predetermined number of consecutive good stationary frames. The decoder also includes a frame reconstructor configured to reconstruct an erroneous frame with the latest good stationary frame, but with reversed signs of transform coefficients in sub-vectors having an accumulated number of sign changes that exceeds a predetermined threshold.

According to a fifth aspect, the proposed technology involves another embodiment of a decoder configured for frame error concealment based on frames including transform coefficient vectors. The decoder includes a sign change tracking module for tracking sign changes between corresponding transform coefficients of predetermined sub-vectors of consecutive good stationary frames. The decoder further includes a sign change accumulation module for accumulating the number of sign changes in corresponding sub-vectors of a predetermined number of consecutive good stationary frames. The decoder also includes a frame reconstruction module for reconstructing an erroneous frame with the latest good stationary frame, but with reversed signs of transform coefficients in sub-vectors having an accumulated number of sign changes that exceeds a predetermined threshold.

According to a sixth aspect, the proposed technology involves a further embodiment of a decoder configured for frame error concealment based on frames including transform coefficient vectors. The decoder includes a processor and a memory, where the memory contains instructions executable by the processor, whereby the decoder is operative to perform the following actions: It tracks sign changes between corresponding transform coefficients of predetermined sub-vectors of consecutive good stationary frames. It accumulates the number of sign changes in corresponding sub-vectors of a predetermined number of consecutive good stationary frames. It reconstructs an erroneous frame with the latest good stationary frame, but with reversed signs of transform coefficients in sub-vectors having an accumulated number of sign changes that exceeds a predetermined threshold.

According to a seventh aspect, the proposed technology involves a user terminal including a decoder in accordance with the fourth, fifth or sixth aspect.

At least one of the embodiments is able to improve the subjective audio quality in case of frame loss, frame delay or frame corruption, and this improvement is achieved without transmitting additional side parameters or generating extra delays required by interpolation, and with low complexity and memory requirements.

BRIEF DESCRIPTION OF THE DRAWINGS

The proposed technology, together with further objects and advantages thereof, may best be understood by making reference to the following description taken together with the accompanying drawings, in which.

DETAILED DESCRIPTION

Figure 1:
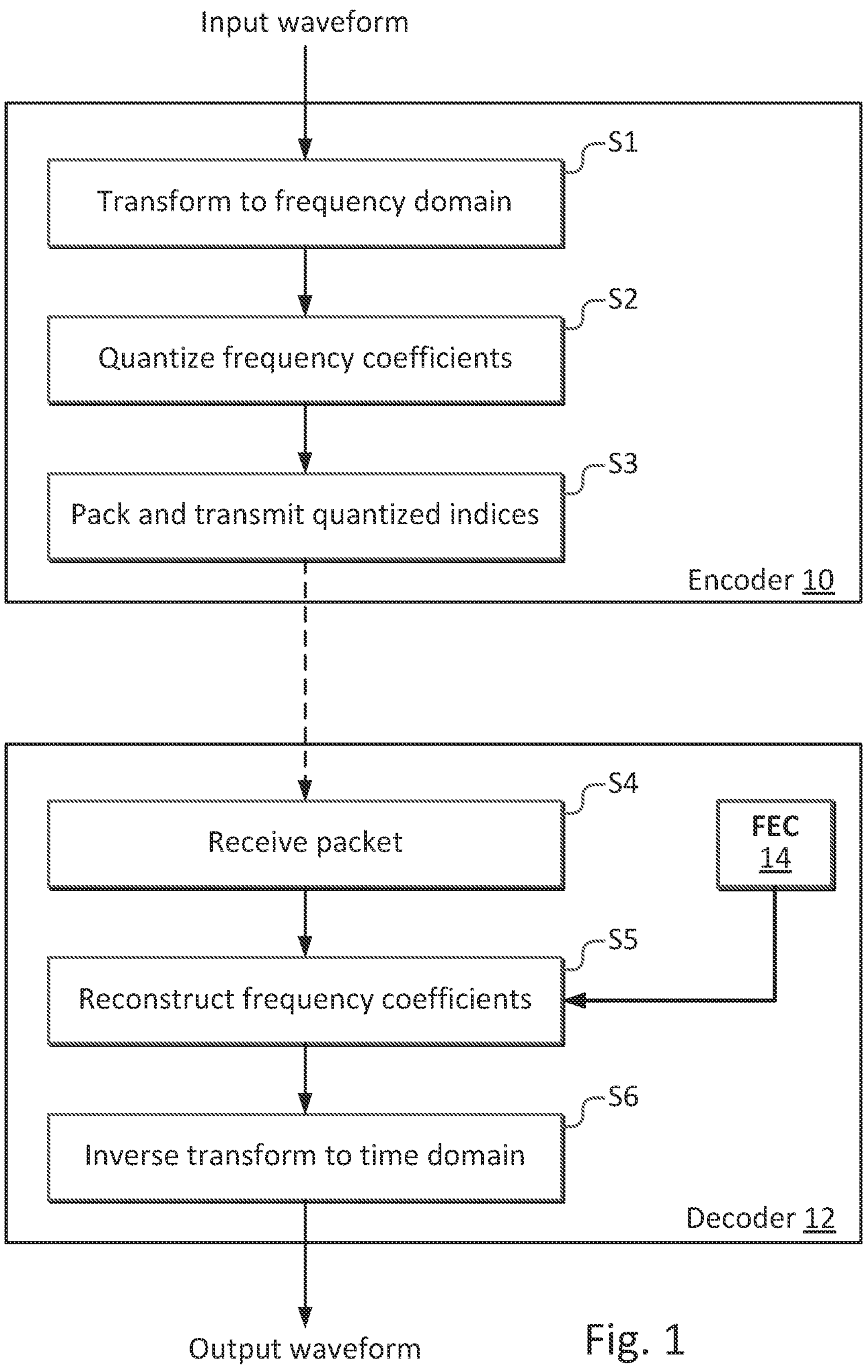
FIG. 1 is a diagram illustrating the concept of frame error concealment.

Throughout the drawings, the same reference designations are used for similar or corresponding elements.

The technology proposed herein is generally applicable to Modulated Lapped Transform (MLT) types, for example MDCT, which is the presently preferred transform. In order to simplify the description only the MDCT will be discussed below.

Furthermore, in the description below the terms lost frame, delayed frame, corrupt frame and frames containing corrupted data all represent examples of erroneous frames which are to be reconstructed by the proposed frame error concealment technology. Similarly the term "good frames" will be used to indicate non-erroneous frames.

The use of a frame repeat-algorithm for concealing frame errors in a transform codec which uses the MDCT may cause degradation in the reconstructed audio signal, due to the fact that in the MDCT-domain, the phase information is conveyed both in the amplitude and in the sign of the MDCT-coefficients. For tonal or harmonic components, the evolution of the corresponding MDCT coefficients in terms of amplitude and sign depends on the frequency and the initial phase of the underlying tones. The MDCT coefficients for the tonal components in the lost frame may sometimes have the same sign and amplitude as in the previous frame, wherein a frame repeat-algorithm will be advantageous. However, sometimes the MDCT coefficients for the tonal components have changed sign and/or amplitude in the lost frame, and in those cases the frame repeat-algorithm will not work well. When this happens, the sign-mismatch caused by repeating the coefficients with the wrong sign will cause the energy of the tonal components to be spread out over a larger frequency region, which will result in an audible distortion.

The embodiments described herein analyze the sign-changes of MDCT coefficients in previously received frames, e.g. using a sign change tracking algorithm, and use the collected data regarding the sign-change for creating a low complexity FEC algorithm with improved perceptual quality.

Since the problem with phase discontinues is most audible for strong tonal components, and such components will affect a group of several coefficients, the transform coefficients may be grouped into sub-vectors on which the sign-analysis is performed. The analysis according to embodiments described herein also takes into account the signal dynamics, for example as measured by a transient detector, in order to determine the reliability of past data. The number of sign changes of the transform coefficients may be determined for each sub-vector over a defined number of previously received frames, and this data is used for determining the signs of the transform coefficients in a reconstructed sub-vector. According to embodiments described herein, the sign of all coefficients in a sub-vector used in a frame repeat algorithm will be switched (reversed), in case the determined number of sign-changes of the transform coefficients in each corresponding sub-vector over the previously received frames is high, i.e. is equal to or exceeds a defined switching threshold.

Embodiments described herein involve a decoder-based sign extrapolation-algorithm that uses collected data from a sign change tracking algorithm for extrapolating the signs of a reconstructed MDCT vector. The sign extrapolation-algorithm is activated at a frame loss.

The sign extrapolation-algorithm may further keep track of whether the previously received frames (as stored in a memory, i.e. in a decoder buffer) are stationary or if they contain transients, since the algorithm is only meaningful to perform on stationary frames, i.e. when the signal does not contain transients. Thus, according to an embodiment, the sign of the reconstructed coefficients will be randomized, in case any of the analyzed frames of interest contain a transient.

An embodiment of the sign extrapolation-algorithm is based on sign-analysis over three previously received frames, due to the fact that three frames provide sufficient data in order to achieve a good performance. In case only the last two frames are stationary, the frame n−3 is discarded. The analysis of the sign-change over two frames is similar to the analysis of the sign-change over three frames, but the threshold level is adapted accordingly.

Figure 2A:
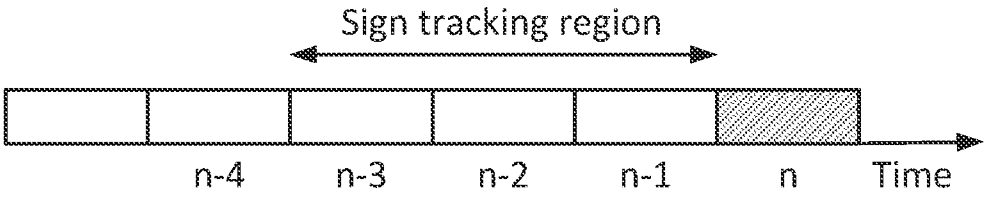
FIGS. 2A, 2B, and 2C are diagrams illustrating sign change tracking.
Figure 2B:
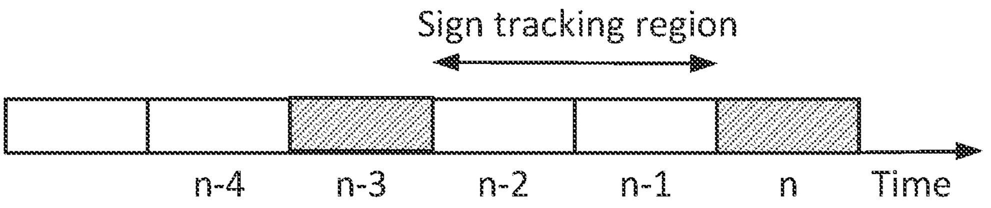
Figure 2C:
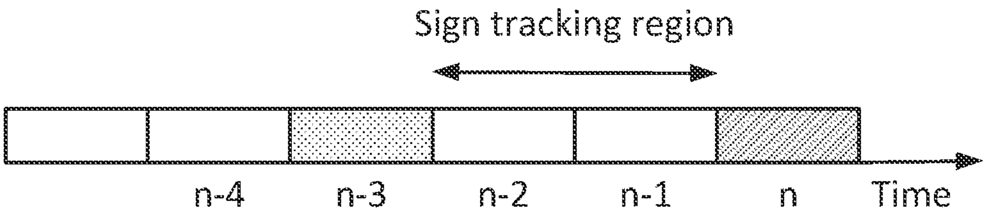

FIGS. 2A, 2B, and 2C are diagrams illustrating sign change tracking. If the recent signal history contains only good frames, the sign change is tracked in three consecutive frames, as illustrated in FIG. 2A. In case of a transient or lost frame, as in FIGS. 2B and 2C, the sign change is calculated on the two available frames. The current frame has index "n", a lost frame is denoted by a dashed box, and a transient frame by a dotted box. Thus, in FIG. 2A the sign tracking region is 3 frames, and in FIGS. 2B and 2C the sign tracking region is 2 frames.

Figure 3A:
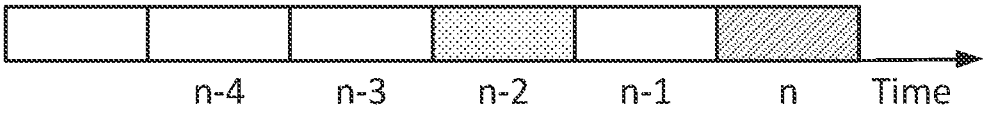
FIGS. 3A and 3B are diagrams illustrating situations in which sign changes are not considered meaningful.
Figure 3B:
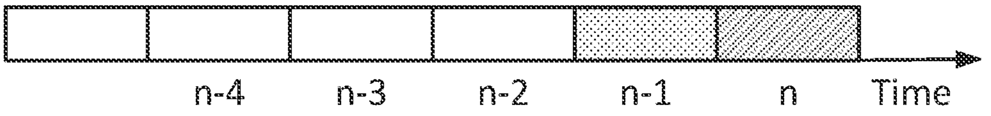

FIGS. 3A and 3B are diagrams illustrating situations in which sign changes are not considered meaningful. In this case one of the last two frames before an erroneous frame n is a transient (or non-stationary) frame. In this case the sign extrapolation algorithm may force a "random" mode for all sub-vectors of the reconstructed frame.

Tonal or harmonic components in the time-domain audio signal will affect several coefficients in the MDCT domain. A further embodiment captures this behavior in the sign-analysis by determining the number of sign-changes of groups of MDCT coefficients, instead of on the entire vector of MDCT coefficients, such that the MDCT coefficients are grouped into e.g. 4-dimensional bands in which the sign analysis is performed. Since the distortion caused by sign mismatch is most audible in the low frequency region, a further embodiment of the sign analysis is only performed in the frequency range 0-1600 Hz, in order to reduce computational complexity. If the frequency resolution of the MDCT transform used in this embodiment is e.g. 25 Hz per coefficient, the frequency range will consist of 64 coefficients which could be divided into B bands, where B=16 in this example.

Figure 4:
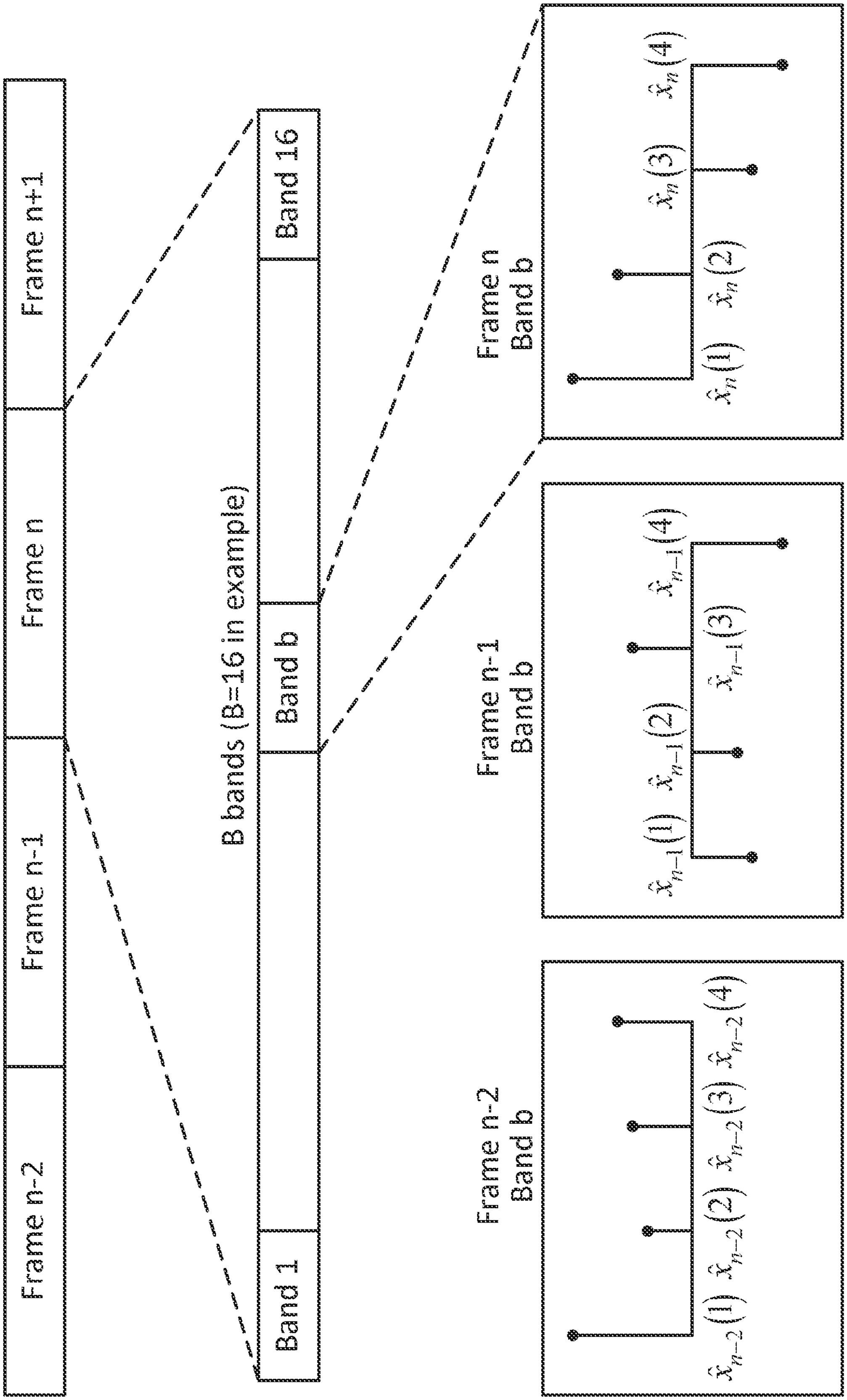
FIG. 4 is a diagram illustrating frame structure.

FIG. 4 is a diagram illustrating the frame structure of the above example. A number of consecutive good frames are illustrated. Frame n has been expanded to illustrate that it contains 16 bands or sub-vectors. Band b of frame n has been expanded to illustrate the 4 transform coefficients $\hat{x}_n(1), \ldots, \hat{x}_n(4)$. The transform coefficients $\hat{x}_{n-1}(1), \ldots, \hat{x}_{n-1}(4)$ and $\hat{x}_{n-2}(1), \ldots, \hat{x}_{n-2}(4)$ of the corresponding sub-vector or band b of frames n−1 and n−2, respectively, are also illustrated.

According to an embodiment, the determining of the number of sign-changes of the transform coefficients in frames received by the decoder is performed by a sign change tracking-algorithm, which is active as long as the decoder receives frames, i.e. as long as there are no frame losses. During this period, the decoder may update two state variables, $s_n$ and $\Delta_n$ for each sub-vector or band b used in the sign analysis, and in the example with 16 sub-vectors there will thus be 32 state variables.

The first state variable s n for each sub-vector or band b holds the number of sign switches between the current frame n and the past frame n−1, and is updated in accordance with (note that here frame n is considered to be a good frame, while frame n in FIGS. 2A, 2B, 2C, 3A, and 3B was an erroneous frame):

$$\begin{aligned}
&\text{if } isTransient_n == 0 \\
&\quad \text{for } b \in B \\
&\quad\quad \text{for } i_b \in b \\
&\quad\quad\quad \text{if } \hat{x}_n(i_b) * \hat{x}_{n-1}(i_b) < 0 \\
&\quad\quad\quad\quad s_n(b) = s_n(b) + 1
\end{aligned} \tag{1}$$

where the index $i_b$ indicates coefficients in sub-vector or band b, n is the frame number, and $\hat{x}_n$ is the vector of received quantized transform coefficients.

If the frame n is a transient, which is indicated by the variable $isTransient_n$ in (1), the number of sign switches is not relevant information, and will be set to 0 for all bands.

The variable $isTransient_n$ is obtained as a "transient bit" from the encoder, and may be determined on the encoder side as described in [4].

The second state variable A n for each sub-vector holds the aggregated number of sign switches between the current frame n and the past frame n−1 and between the past frame n−1 and the frame n−2, in accordance with:

$$\text{if } isTransient_n == 0 \quad (2)$$
$$\text{for } b \in B$$
$$\Delta_n(b) = s_n(b) + s_{n-1}(b)$$

The sign extrapolation-algorithm is activated when the decoder does not receive a frame or the frame is bad, i.e. if the data is corrupted.

According to an embodiment, when a frame is lost (erroneous), the decoder first performs a frame repeat-algorithm and copies the transform coefficients from the previous frame into the current frame. Next, the algorithm checks if the three previously received frames contain any transients by checking the stored transient flags for those frames. (However, if any of the last two previously received frames contains transients, there is no useful data in the memory to perform sign analysis on and no sign prediction is performed, as discussed with reference to FIG. 3A and FIG. 3B).

If at least the two previously received frames are stationary, the sign extrapolation-algorithm compares the number of sign-switches ($\Delta_n$) for each band with a defined switching threshold T and switches, or flips, the signs of the corresponding coefficients in the current frame if the number of sign-switches is equal to or exceeds the switching threshold.

According to an embodiment, and under the assumption of 4-dim bands, the level of the switching threshold T depends on the number of stationary frames in the memory, according to the following:

$$\text{if } isTransient_n == 0 \quad (2)$$
$$for\ b \in B$$
$$\Delta_n(b) = s_n(b) + s_{n-1}(b)$$

The comparison with the threshold T and the potential sign flip/switch for each band is done according to the following (wherein a sign flip or reversal is indicated by −1):

$$\text{for } b \in B \quad (4)$$
$$\text{for } i_b \in b$$
$$\text{sign}(\hat{x}_n(i_b)) = \begin{cases} -1 & \text{if } \Delta_n(b) \geq T \\ +1 & \text{if } \Delta_n(b) < T \end{cases}$$

In this scheme, the extrapolated sign of the transform coefficients in the first lost frame is either switched, or kept the same as in the last good frame. In case there is a sequence of lost frames, in one embodiment the sign is randomized from the second frame.

Table 1 below is a summary of the sign extrapolation-algorithm for concealment of lost frame with index "n", according to an embodiment (Note that here frame n is considered erroneous, while frame n was considered good in the above equations. Thus, there is an index shift of 1 unit in the table):

TABLE 1

| | |
|---|---|
| If any of frames n − 1 and n − 2 contains transient | Apply random sign to the copied frequency coefficients |
| If frames n − 1 and n − 2 are good, but n − 3 is lost or transient frame | Apply sign extrapolation with switching threshold T = 3 |
| If all n − 1, n − 2, n − 3 are good | Apply sign extrapolation with switching threshold T = 6 |

Figure 5:
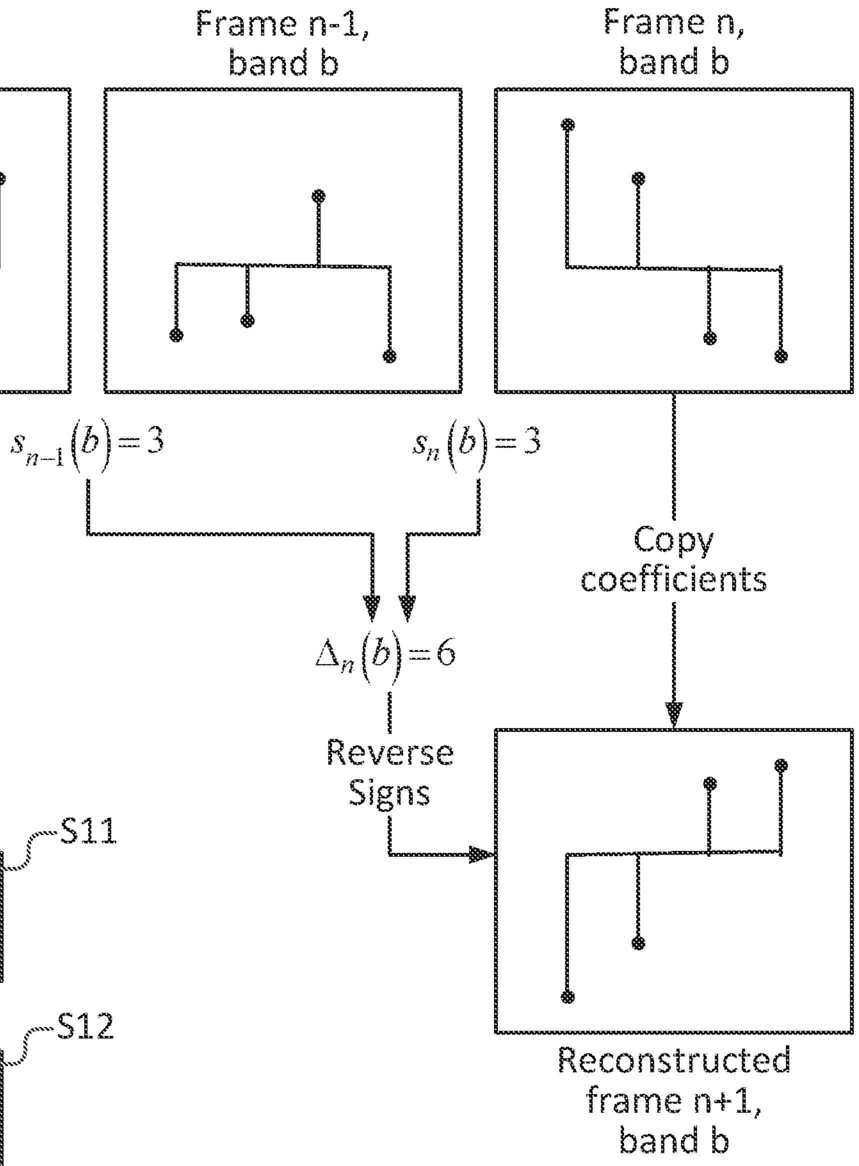
FIG. 5 is a diagram illustrating an example of reconstruction of a sub-vector of an erroneous frame.

FIG. 5 is a diagram illustrating an example of reconstruction of a sub-vector of an erroneous frame. In this example the sub-vectors from FIG. 4 will be used to illustrate the reconstruction of frame n+1, which is assumed to be erroneous. The 3 frames n, n−1, n−2 are all considered to be stationary ($isTransient_n$=0, $isTransient_{n-1}$=0, $isTransient_{n-2}$=0). First the sign change tracking of (1) above is used to calculate $s_n$ (b) and $s_{n-1}$(b). In the example there are 3 sign reversals between corresponding sub-vector coefficients of frame n and n−1, and 3 sign reversals between corresponding sub-vector coefficients of frame n−1 and n−2. Thus, $s_n$ (b)=3 and $s_{n-1}$(b)=3, which according to the sign change accumulation of (2) above implies that $\Delta_n$(b)=6. According to the threshold definition (3) and the sign extrapolation (4) this is sufficient (in this example) to reverse the signs of the coefficients that are copied from sub-vector b of frame n into sub-vector b of frame n+1, as illustrated in FIG. 5.

Figure 6:
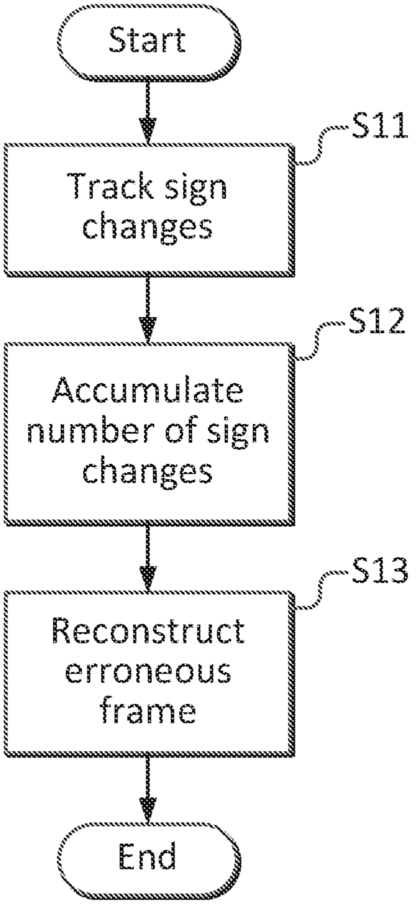
FIG. 6 is a flow chart illustrating a general embodiment of the proposed method.

FIG. 6 is a flow chart illustrating a general embodiment of the proposed method. This flow chart may also be viewed as a computer flow diagram. Step S11 tracks sign changes between corresponding transform coefficients of predetermined sub-vectors of consecutive good stationary frames. Step S12 accumulates the number of sign changes in corresponding sub-vectors of a predetermined number of consecutive good stationary frames. Step S13 reconstructs an erroneous frame with the latest good stationary frame, but with reversed signs of transform coefficients in sub-vectors having an accumulated number of sign changes that exceeds a predetermined threshold.

As noted above, the threshold may depend on the predetermined number of consecutive good stationary frames. For example, the threshold is assigned a first value for 2 consecutive good stationary frames and a second value for 3 consecutive good stationary frames.

Furthermore, stationarity of a received frame may be determined by determining whether it contain any transients, for example by examining the variable $isTransient_n$ as described above.

A further embodiment uses three modes of switching of the sign of the transform coefficients, e.g. switch, preserve, and random, and this is realized through comparison with two different thresholds, i.e. a preserve threshold $T^p$ and a switching threshold $T^s$. This means that the extrapolated sign of the transform coefficients in the first lost frame is switched in case the number of sign switches is equal to or exceeds the switching threshold $T^s$, and is preserved in case number of sign switches is equal to or lower than the preserve threshold $T^p$. Further, the signs are randomized in case the number of sign switches is larger than the preserve threshold $T^p$ and lower than the switching threshold $T^s$, i.e.:

$$\text{for } b \in B \qquad (5)$$

$$\text{for } i_b \in b$$

$$\operatorname{sign}(\hat{x}_n(i_b)) = \begin{cases} -1 & \text{if} \quad \Delta_n(b) \geq T^s \\ rand() & \text{if} \quad T^p < \Delta_n(b) < T^s \\ +1 & \text{if} \quad \Delta_n(b) \leq T^p \end{cases}$$

In this scheme the sign extrapolation in the first lost frame is applied on the second and so on, as the randomization is already part of the scheme.

According to a further embodiment, a scaling factor (energy attenuation) is applied to the reconstructed coefficients, in addition to the switching of the sign:

$$\hat{x}_n = G^* \hat{x}_{n-1} \qquad (6)$$

In equation (6) G is a scaling factor which may be 1 if no gain prediction is used, or G≤1 in the case of gain prediction (or simple attenuation rule, like −3 dB for each consecutive lost frame).

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers.

It should also be understood that it may be possible to re-use the general processing capabilities of any conventional device or unit in which the proposed technology is implemented. It may also be possible to re-use existing software, e.g. by reprogramming of the existing software or by adding new software components.

Figure 7:
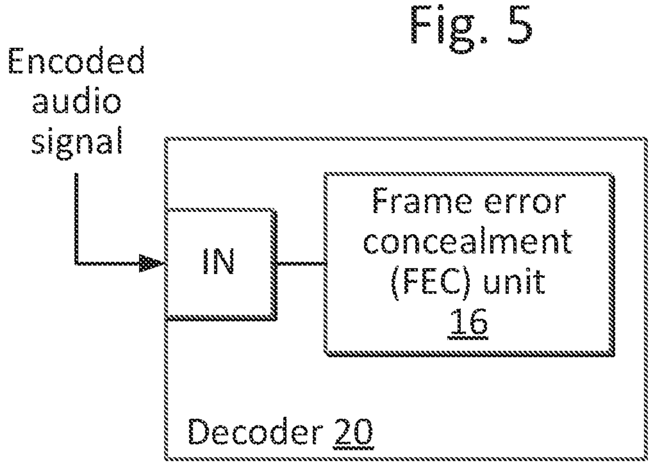
FIG. 7 is a block diagram giving an overview of the proposed technology.

The embodiments described herein apply to a decoder for an encoded audio signal, as illustrated in FIG. 7. Thus, FIG. 7 is a schematic block diagram of a decoder 20 according to the embodiments. The decoder 20 comprises an input unit IN configured to receive an encoded audio signal. The figure illustrates the frame loss concealment by a logical frame error concealment-unit (FEC) 16, which indicates that the decoder 20 is configured to implement a concealment of a lost or corrupt audio frame, according to the above-described embodiments. The decoder 20 with its included units could be implemented in hardware. There are numerous variants of circuitry elements that can be used and combined to achieve the functions of the units of the decoder 20. Such variants are encompassed by the embodiments. Particular examples of hardware implementation of the decoder are implementation in digital signal processor (DSP) hardware and integrated circuit technology, including both general-purpose electronic circuitry and application-specific circuitry.

Figure 8:
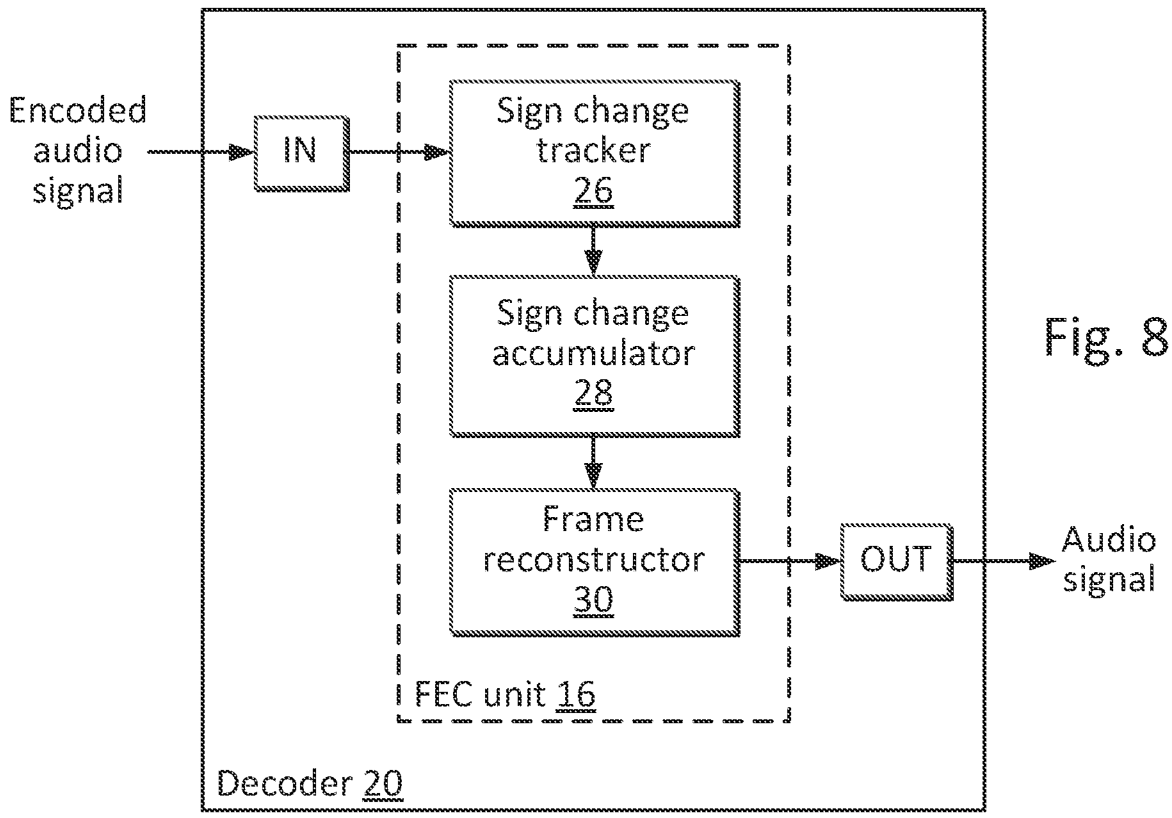
FIG. 8 is a block diagram of an example embodiment of a decoder in accordance with the proposed technology.

FIG. 8 is a block diagram of an example embodiment of a decoder 20 in accordance with the proposed technology. An input unit IN extracts transform coefficient vectors from an encoded audio signal and forwards them to the FEC unit 16 of the decoder 20. The decoder 20 includes a sign change tracker 26 configured to track sign changes between corresponding transform coefficients of predetermined sub-vectors of consecutive good stationary frames. The sign change tracker 26 is connected to a sign change accumulator 28 configured to accumulate the number of sign changes in corresponding sub-vectors of a predetermined number of consecutive good stationary frames. The sign change accumulator 28 is connected to a frame reconstructor 30 configured to reconstruct an erroneous frame with the latest good stationary frame, but with reversed signs of transform coefficients in sub-vectors having an accumulated number of sign changes that exceeds a predetermined threshold. The reconstructed transform coefficient vector is forwarded to an output unit OUT, which coverts it into an audio signal.

Figure 9:
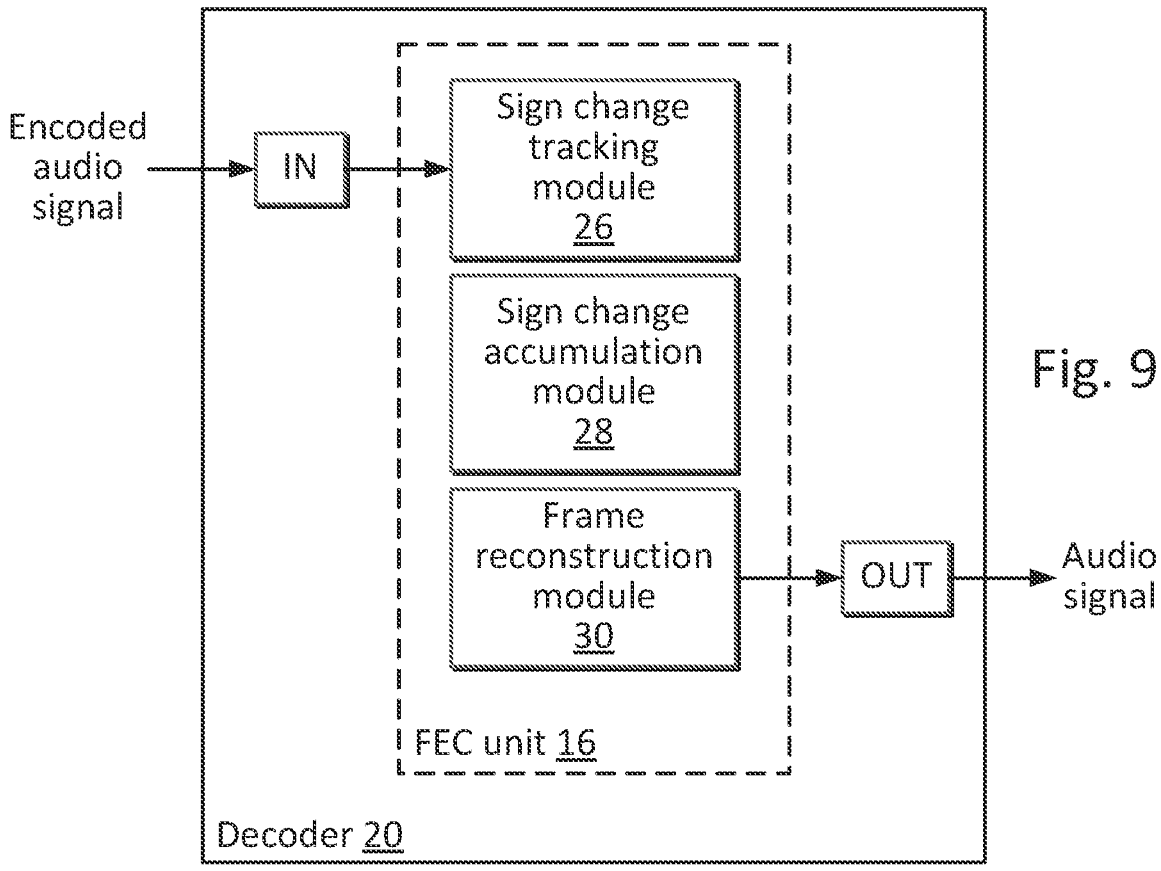
FIG. 9 is a block diagram of an example embodiment of a decoder in accordance with the proposed technology.

FIG. 9 is a block diagram of an example embodiment of a decoder in accordance with the proposed technology. An input unit IN extracts transform coefficient vectors from an encoded audio signal and forwards them to the FEC unit 16 of the decoder 20. The decoder 20 includes:

A sign change tracking module 26 for tracking sign changes between corresponding transform coefficients of predetermined sub-vectors of consecutive good stationary frames.

A sign change accumulation module 28 for accumulating the number of sign changes in corresponding sub-vectors of a predetermined number of consecutive good stationary frames.

A frame reconstruction module 30 for reconstructing an erroneous frame with the latest good stationary frame, but with reversed signs of transform coefficients in sub-vectors having an accumulated number of sign changes that exceeds a predetermined threshold.

The reconstructed transform coefficient vector is converted into an audio signal in an output unit OUT.

Figure 10:
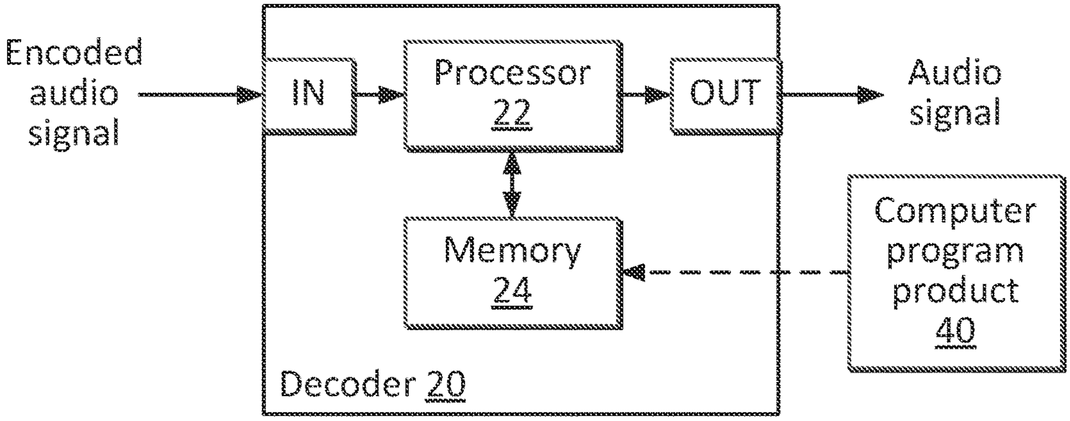
FIG. 10 is a block diagram of an example embodiment of a decoder in accordance with the proposed technology.

FIG. 10 is a block diagram of an example embodiment of a decoder 20 in accordance with the proposed technology. The decoder 20 described herein could alternatively be implemented e.g. by one or more of a processor 22 and adequate software with suitable storage or memory 24 therefore, in order to reconstruct the audio signal, which includes performing audio frame loss concealment according to the embodiments described herein. The incoming encoded audio signal is received by an input unit IN, to which the processor 22 and the memory 24 are connected. The decoded and reconstructed audio signal obtained from the software is outputted from the output unit OUT.

More specifically the decoder 20 includes a processor 22 and a memory 24, and the memory contains instructions executable by the processor, whereby the decoder 20 is operative to:

Track sign changes between corresponding transform coefficients of predetermined sub-vectors of consecutive good stationary frames.

Accumulate the number of sign changes in corresponding sub-vectors of a predetermined number of consecutive good stationary frames.

Reconstruct an erroneous frame with the latest good stationary frame, but with reversed signs of transform coefficients in sub-vectors having an accumulated number of sign changes that exceeds a predetermined threshold.

Illustrated in FIG. 10 is also a computer program product 40 comprising a computer readable medium and a computer program (further described below) stored on the computer readable medium. The instructions of the computer program may be transferred to the memory 24, as indicated by the dashed arrow.

Figure 11:
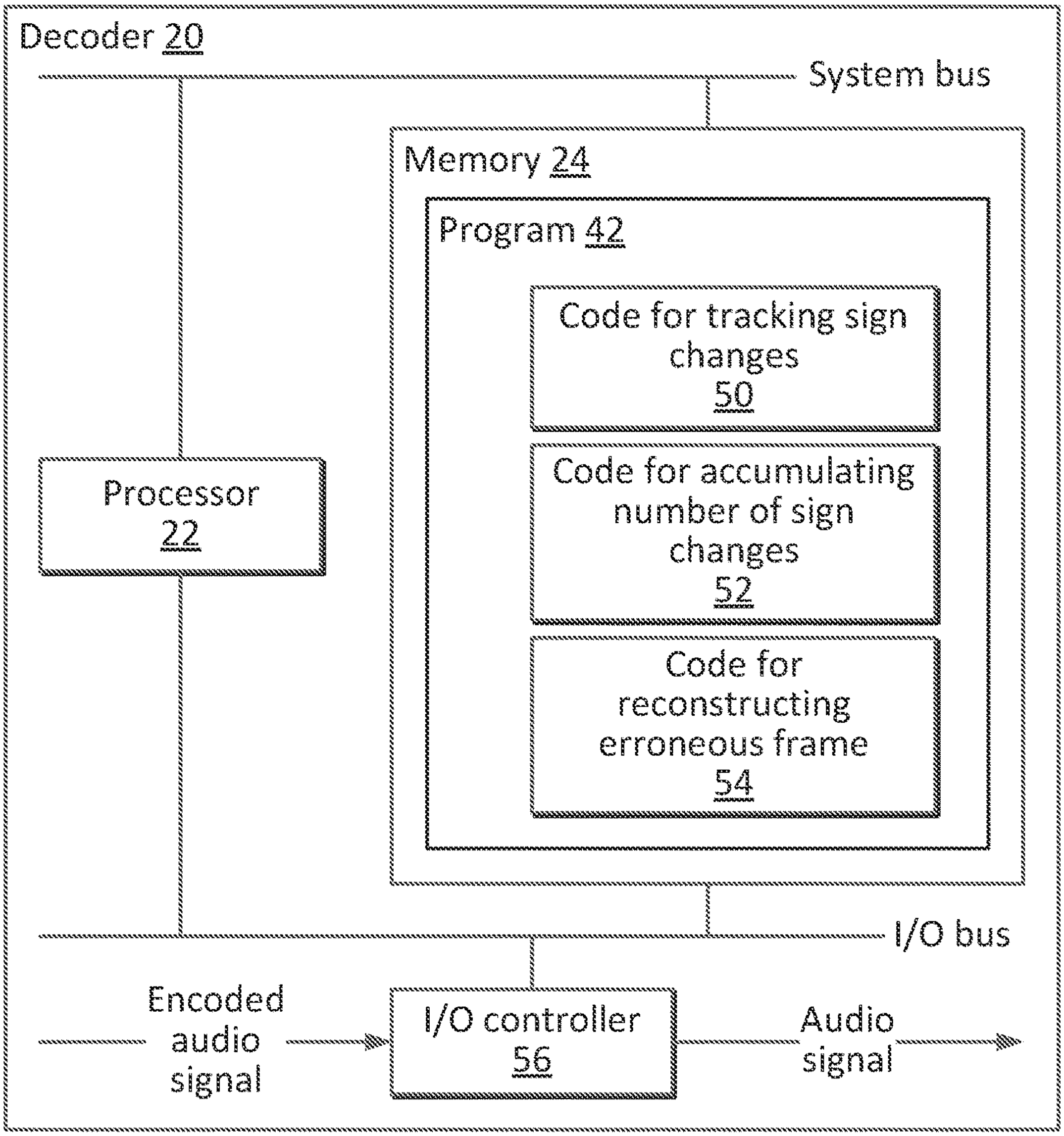
FIG. 11 is a block diagram of an example embodiment of a decoder in accordance with the proposed technology.

FIG. 11 is a block diagram of an example embodiment of a decoder 20 in accordance with the proposed technology. This embodiment is based on a processor 22, for example a micro processor, which executes a computer program 42 for frame error concealment based on frames including transform coefficient vectors. The computer program is stored in memory 24. The processor 22 communicates with the memory over a system bus. The incoming encoded audio signal is received by an input/output (I/O) controller 56 controlling an I/O bus, to which the processor 22 and the memory 24 are connected. The audio signal obtained from the software 130 is outputted from the memory 24 by the I/O controller 56 over the I/O bus. The computer program 42 includes code 50 for tracking sign changes between corresponding transform coefficients of predetermined sub-vectors of consecutive good stationary frames, code 52 for accumulating the number of sign changes in corresponding sub-vectors of a predetermined number of consecutive good stationary frames, and code 54 for reconstructing an erroneous frame with the latest good stationary frame, but with reversed signs of transform coefficients in sub-vectors having an accumulated number of sign changes that exceeds a predetermined threshold.

The computer program residing in memory may be organized as appropriate function modules configured to perform, when executed by the processor, at least part of the steps and/or tasks described above. An example of such function modules is illustrated in FIG. 9.

As noted above, the software or computer program 42 may be realized as a computer program product 40, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

For example, the computer program includes instructions executable by the processing circuitry, whereby the processing circuitry is able or operative to execute the steps, functions, procedure and/or blocks described herein.

The computer or processing circuitry does not have to be dedicated to only execute the steps, functions, procedure and/or blocks described herein, but may also execute other tasks.

The technology described above may be used e.g. in a receiver, which can be used in a mobile device (e.g. mobile phone, laptop) or a stationary device, such as a personal computer. This device will be referred to as a user terminal including a decoder 20 as described above. The user terminal may be a wired or wireless device.

As used herein, the term "wireless device" may refer to a User Equipment, UE, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "wired device" may refer to at least some of the above devices (with or without radio communication capability), for example a PC, when configured for wired connection to a network.

Figure 12:
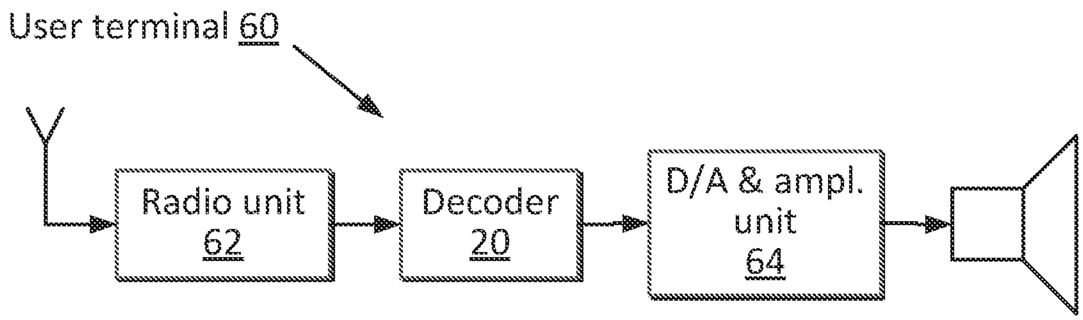
FIG. 12 is a block diagram of a user terminal.

FIG. 12 is a block diagram of a user terminal 60. The diagram illustrates a user equipment, for example a mobile phone. A radio signal from an antenna is forwarded to a radio unit 62, and the digital signal from the radio unit is processed by a decoder 20 in accordance with the proposed frame error concealment technology (typically the decoder may perform other task, such as decoding of other parameters describing the segment, but these tasks are not described since they are well known in the art and do not form an essential part of the proposed technology). The decoded audio signal is forwarded to a digital/analog (D/A) signal conversion and amplification unit 64 connected to a loudspeaker.

Figure 13:
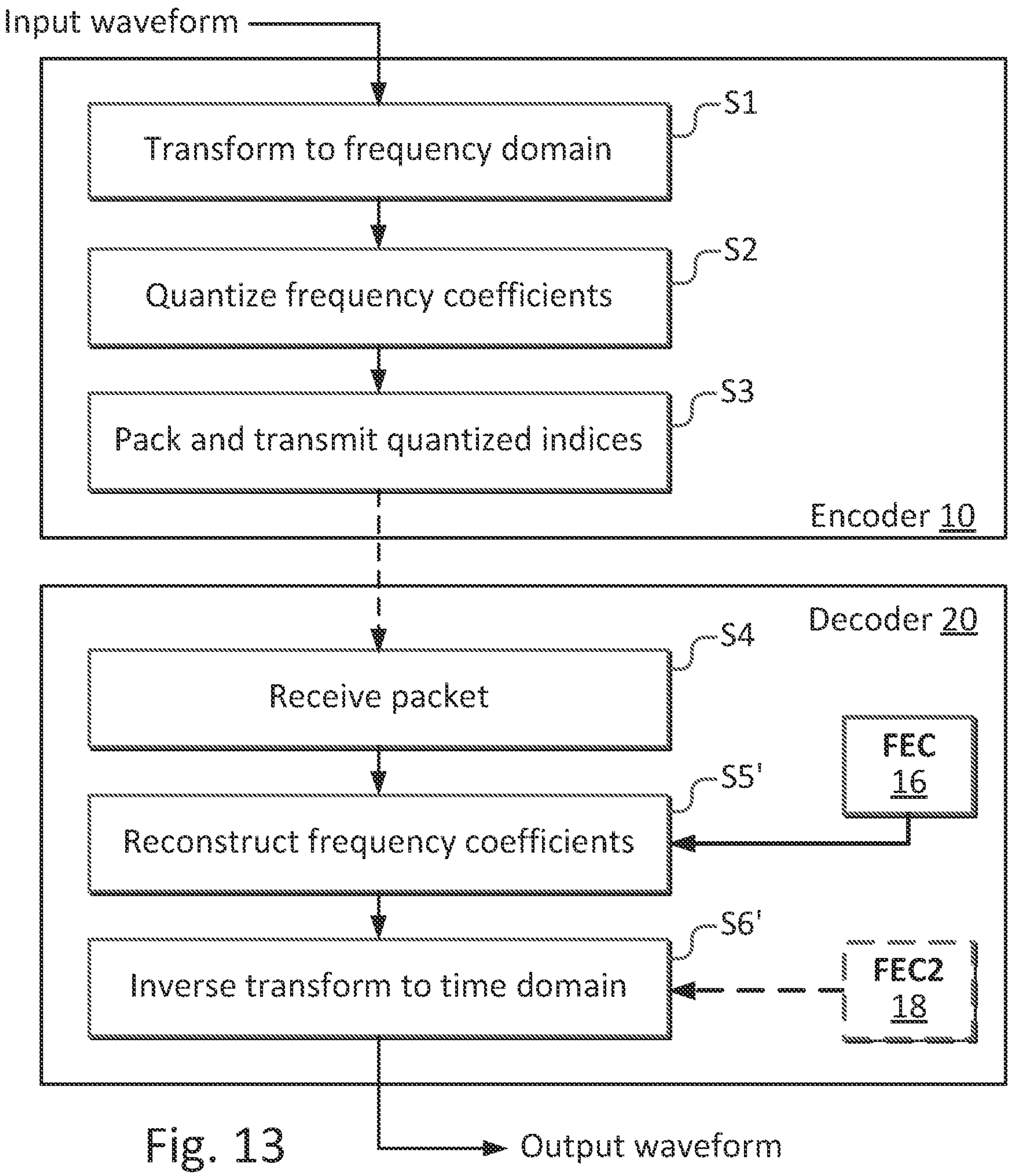
FIG. 13 is a diagram illustrating another embodiment of frame error concealment.

FIG. 13 is a diagram illustrating another embodiment of frame error concealment. The encoder side 10 is similar to the embodiment of FIG. 1. However, the encoder side includes a decoder 20 in accordance with the proposed technology. This decoder includes an frame error concealment unit (FEC) 16 as proposed herein. This unit modifies the reconstruction step S5 of FIG. 1 into a reconstruction step S5' based on the proposed technology. According to a further embodiment, the above-described error concealment algorithm may optionally be combined with another concealment algorithm on a different domain. In FIG. 13 this is illustrated by an optional frame error concealment unit FEC2 18, in which a waveform pitch-based concealment is also performed. This will modify step S6 into S6'. Thus, in this embodiment the reconstructed waveform contains contributions from both concealment schemes.

It is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either a hardware-implemented and/or a computer-implemented, and thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

It will be understood by those skilled in the art that various modifications and changes may be made to the proposed technology without departure from the scope thereof, which is defined by the appended claims.

REFERENCES

[1] ITU-T standard G.719, section 8.6, June 2008.

[2] A. Ito et al, "Improvement of Packet Loss Concealment for MP3 Audio Based on Switching of Concealment method and Estimation of MDCT Signs", IEEE, 2010 Sixth International Conference on Intelligent Information Hiding and Multimedia Signal Processing, pp. 518-521.

[3] Sang-Uk Ryu and Kenneth Rose, "An MDCT Domain Frame-Loss Concealment Technique for MPEG Advanced Audio Coding", IEEE, ICASSP 2007, pp. 1-273-1-276.

[4] ITU-T standard G.719, section 7.1, June 2008.

ABBREVIATIONS

ASIC Application Specific Integrated Circuit
CPU Central Processing Units
DSP Digital Signal Processor
FEC Frame Erasure Concealment
FPGA Field Programmable Gate Array
MDCT Modified Discrete Cosine Transform
MLT Modulated Lapped Transform
PLC Packet Loss Concealment

The invention claimed is:

1. A frame loss concealment method performed by an audio decoder, the method comprising:
   - receiving a first frame comprising B bands of n transform coefficients, where B>1 and n>1;
   - receiving a second frame comprising B bands of n transform coefficients;
   - for the first band of the first frame, storing a first counter value ($C^{[1]}(1)$);
   - for the first band of the second frame, storing a second counter value ($C^{[2]}(1)$)
   - setting a value of a state variable (denoted $\Delta C^{[2]}(1)$) equal to $C^{[2]}(1)+C^{[1]}(1)$;
   - using $\Delta C^{[2]}(1)$ in a process for producing a constructed frame corresponding to a lost frame wherein
   - the constructed frame comprises an ordered set of B vectors of n transform coefficients, and
   - the process for producing the constructed frame comprises, for each one of the n transform coefficients of the first vector of the constructed frame, determining a sign for the transform coefficient based on $\Delta C^{[2]}(1)$ and a threshold value (T).

2. The method of claim 1, wherein signs of copied transform coefficients are randomized if any of two previous frames contains transient.

3. The method of claim 1, further comprising assigning a value to T based on a number of consecutive frames immediately preceding the lost frame that do not contain transient.

4. The method of claim 3, wherein assigning a value to T based on a number of consecutive frames immediately preceding the lost frame that do not contain transient comprises:
   - assigning a first value to T if the number of consecutive frames immediately preceding the lost frame that do not contain transient is two; and
   - assigning a second value to T if the number of consecutive frames immediately preceding the lost frame that do not contain transient is three.

5. The method of claim 4, wherein when the band comprises 4 coefficients, the first value is 3 and the second value is 6.

6. A computer program product comprising a non-transitory computer readable medium storing a computer program for frame loss concealment, the computer program comprising computer readable code which when run on a processor causes the processor to perform the method of claim 1.

7. An apparatus for frame loss concealment, comprising:
   - a memory; and
   - a processor coupled to the memory, wherein the apparatus is configured to perform a method comprising:
   - receiving a first frame comprising B bands of n transform coefficients, where B>1 and n>1;
   - receiving a second frame comprising B bands of n transform coefficients;

for the first band of the first frame, storing a first counter value ($C^{[1]}(1)$);

for the first band of the second frame, storing a second counter value ($C^{[2]}(1)$) setting a value of a state variable (denoted $\Delta C^{[2]}(1)$) equal to $C^{[2]}(1)+C^{[1]}(1)$;

using $\Delta C^{[2]}(1)$ in a process for producing a constructed frame corresponding to a lost frame, wherein the constructed frame comprises an ordered set of B vectors of n transform coefficients, and the process for producing the constructed frame comprises, for each one of the n transform coefficients of the first vector of the constructed frame, determining a sign for the transform coefficient based on $\Delta C^{[2]}(1)$ and a threshold value (T).

8. The apparatus of claim 7, wherein the apparatus is configured to randomize signs of copied transform coefficients if any of two previous frames contains transient.

9. The apparatus of claim 7, wherein the apparatus is configured to assign a value to T based on a number of consecutive frames immediately preceding the lost frame that do not contain transient.

10. The apparatus of claim 9, wherein the apparatus is configured such that:

the apparatus assigns a first value to T if the number of consecutive frames immediately preceding the lost frame that do not contain transient is two; and the apparatus assigns a second value to T if the number of consecutive frames immediately preceding the lost frame that do not contain transient is three.

11. The apparatus of claim 10, wherein the first value is 3 and the second value is 6.

12. An audio decoder comprising the apparatus of claim 7.

13. A mobile communication device comprising the apparatus of claim 7.

14. An apparatus for frame loss concealment, comprising:

a receiver for receiving a first audio frame, the first audio frame comprising a plurality of bands, each of the plurality of bands of the first audio frame comprising a plurality of transform coefficients;

a memory; and a processor coupled to the memory, wherein the apparatus is configured to:

determine that a next audio frame immediately following the first audio frame is lost; and after determining that the next audio frame is lost, produce a reconstructed frame using the first audio frame, wherein the reconstructed audio frame comprises a plurality of bands, wherein each one of the plurality of bands of the reconstructed audio frame corresponds to one of the plurality of bands of the first audio frame and wherein each band of the reconstructed audio frame comprises a plurality of transform coefficients, for each transform coefficient included in the reconstructed audio frame, the absolute value of the transform coefficient is identical to the absolute value of a corresponding transform coefficient included in the first audio frame, and for a first band of the reconstructed audio frame, the sign of each transform coefficient included in the first band of the reconstructed audio frame is determined based on a sign switch value that indicates a number of transform coefficient sign switches accumulated over two consecutive audio frames, the two consecutive audio frames including the first audio frame and a second audio frame that immediately precedes the first audio frame.

15. An apparatus for frame loss concealment, comprising:

a receiver for receiving a first audio frame, the first audio frame comprising a plurality of bands comprising a first band and a second band, each of the plurality of bands of the first audio frame comprising a plurality of transform coefficients;

a memory; and a processor coupled to the memory, wherein the apparatus is configured to:

determine that a next audio frame immediately following the first audio frame is lost; and as a result of determining that the next audio frame is lost, construct a replacement audio frame, wherein the replacement audio frame comprises a plurality of bands comprising a first band and a second band, the first band of the replacement audio frame corresponds to the first band of the first audio frame, the second band of the replacement audio frame corresponds to the second band of the first audio frame, the first band of the replacement audio frame comprises a plurality of transform coefficients, each of which corresponds to one of the transform coefficients included in the first band of the first audio frame, for each transform coefficient included in the first band of the replacement audio frame, the absolute value of the transform coefficient is identical to the absolute value of its corresponding transform coefficient included in the first band of the first audio frame, for each transform coefficient included in the first band of the replacement audio frame, the sign of the transform coefficient is determined based on a first sign switch value that indicates a first accumulated number of transform coefficient sign switches accumulated over two consecutive audio frames, the two consecutive audio frames including the first audio frame and a second audio frame that immediately precedes the first audio frame, the second band of the replacement audio frame comprises a plurality of transform coefficients, each of which corresponds to one of the transform coefficients included in the second band of the first audio frame, for each transform coefficient included in the second band of the replacement audio frame, the absolute value of the transform coefficient is identical to the absolute value of its corresponding transform coefficient included in the second band of the first audio frame, and for each transform coefficient included in the second band of the replacement audio frame, the sign of the transform coefficient is determined based on a second sign switch value that indicates a second accumulated number of transform coefficient sign switches accumulated over the two consecutive audio frames.

16. The apparatus of claim 15, wherein the apparatus is further configured to calculate the first sign switch value, wherein calculating the first sign switch value comprises calculating $S_n(1)+S_{n-1}(1)$, wherein $S_n(1)$ is a state value associated with the first band of the first audio frame and $S_{n-1}(1)$ is a state value associated with a first band of an audio frame that preceded the first audio frame.

17. The apparatus of claim 15, wherein the apparatus is further configured to calculate the first sign switch value, wherein calculating the first sign switch value comprises:

determining whether $x_n(1)*x_{n-1}(1)<0$; and calculating ($S_n(1)=S_n(1)+1$) as a result of determining that $x_n(1)*x_{n-1}(1)<0$, wherein the first band of the first audio frame comprises a first transform coefficient, $x_n(1)$ is the value of the first transform coefficient of the first band of the first audio frame, $x_{n-1}(1)$ is the value of a first transform coefficient included in a first band of an audio frame that preceded the first audio frame, $S_n(1)$ is the first sign switch value.

18. The apparatus of claim 15, wherein the first sign switch value is associated with the first band of the first audio frame and indicates a first number of transform coefficient sign switches, and the second sign switch value is associated with the second band of the first audio frame and indicates a second number of transform coefficient sign switches.

* * * * *